W. L. McCANDLESS.
ROLL MOLDING MACHINE.
APPLICATION FILED APR. 13, 1914.
1,164,947.
Patented Dec. 21, 1915.
2 SHEETS—SHEET 1.
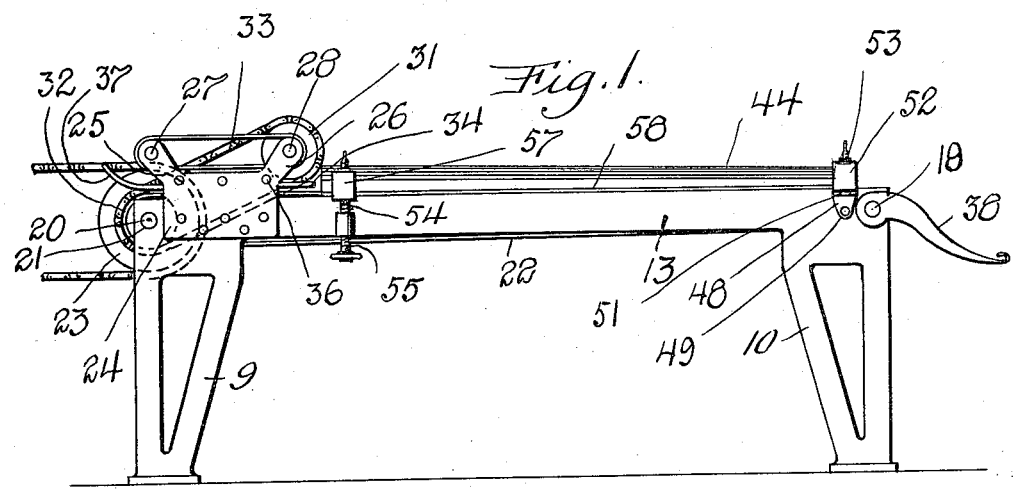
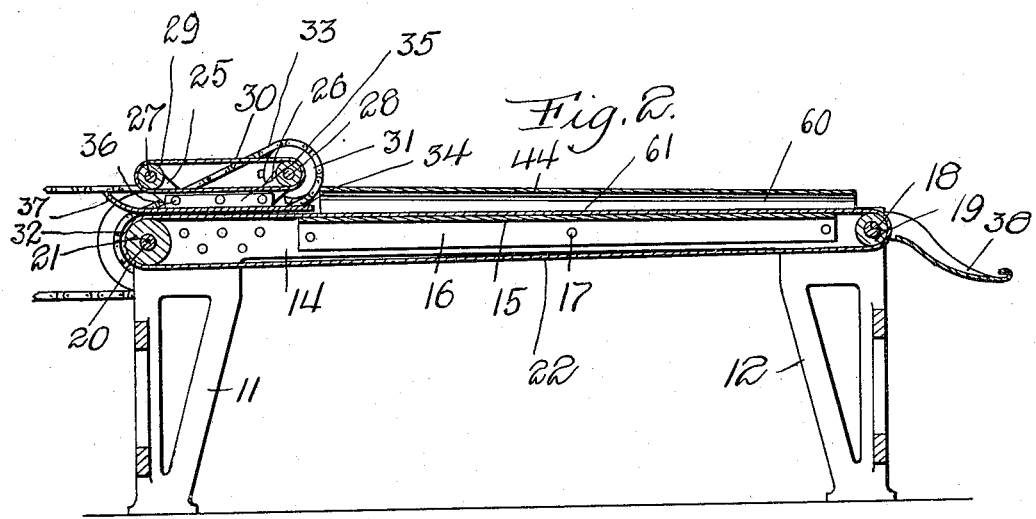
WITNESSES
INVENTOR
W. L. McCandless.
by Nicholas L. Bogan
ATTORNEY

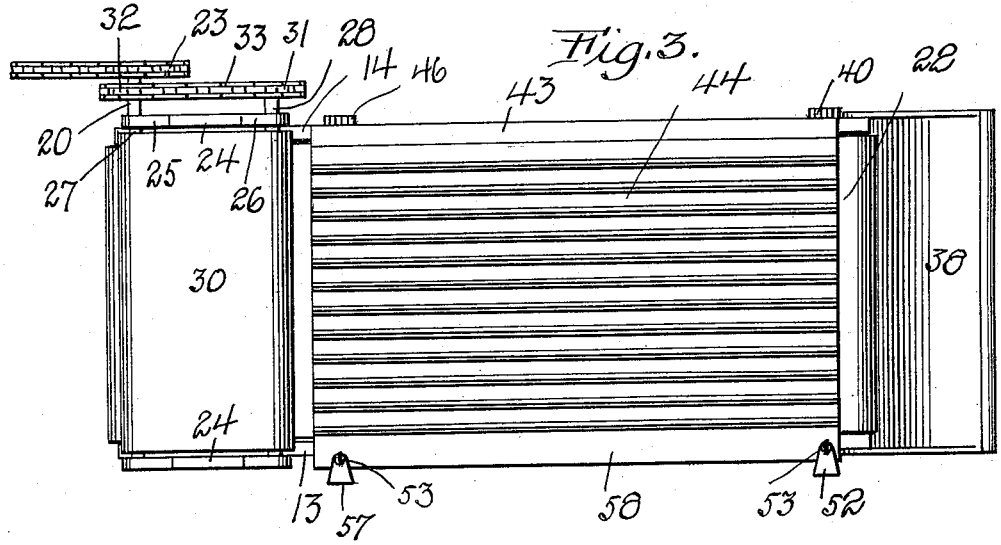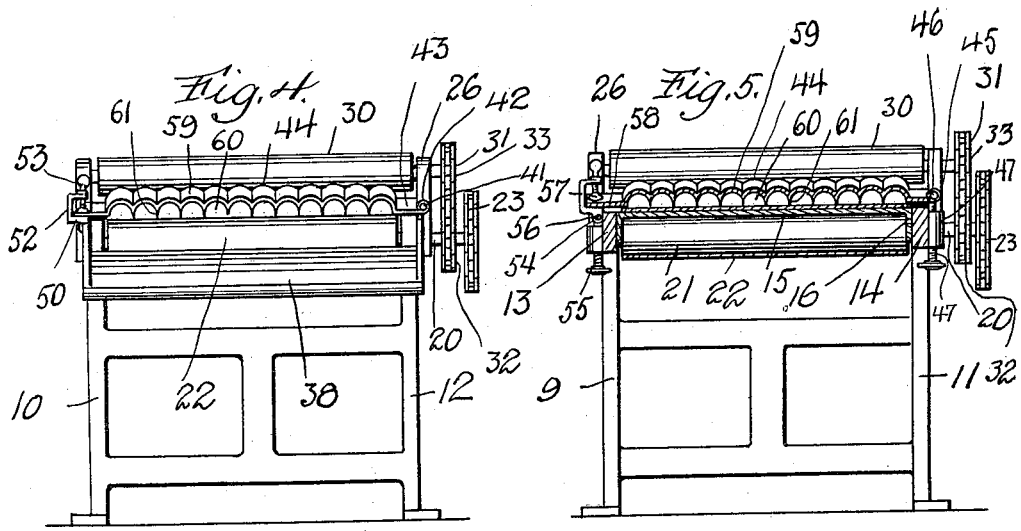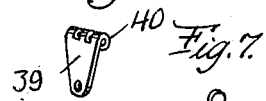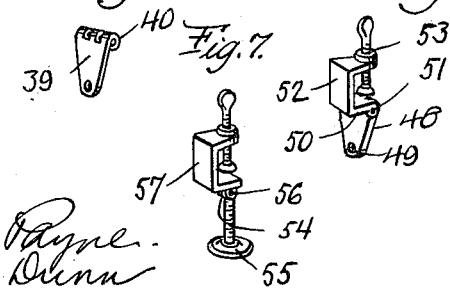

UNITED STATES PATENT OFFICE.

WILLIAM L. McCANDLESS, OF PITTSBURGH, PENNSYLVANIA.

ROLL-MOLDING MACHINE.

1,164,947.  Specification of Letters Patent.  Patented Dec. 21, 1915.

Application filed April 13, 1914.  Serial No. 831,375.

*To all whom it may concern:*

Be it known that I, WILLIAM L. McCANDLESS, a citizen of the United States of America, residing at Pittsburgh, in the county of Allegheny and State of Pennsylvania, have invented certain new and useful Improvements in Roll-Molding Machines, of which the following is a specification, reference being had therein to the accompanying drawing.

This invention relates to roll molding machines, for the manufacture of rolls, biscuits and buns, and has for its object to provide means, in a manner as hereinafter set forth, for molding a loaf of dough in a series of smaller loaves for the purpose of manufacturing rolls, biscuits and buns.

A further object of the invention is to provide a machine, in a manner as hereinafter set forth, for molding a loaf of dough into smaller loaves of a size for manufacturing rolls, biscuits and buns, thereby overcoming the manual forming of the loaf into smaller loaves for roll manufacturing as is generally the case at present.

A further object of the invention is to provide a machine for the purpose set forth with means whereby the size of the molded loaves for manufacturing rolls, biscuits and buns can be varied when occasion so requires.

Further objects of the invention is to provide a dough molding machine for the manufacture of rolls, biscuits and buns, which is simple in its construction and arrangement, strong, durable, efficient in its operation, conveniently employed and comparatively inexpensive to manufacture.

With the foregoing and other objects in view, the invention consists of a novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation of a dough molding machine is accordance with this invention. Fig. 2 is a longitudinal sectional view. Fig. 3 is a top plan view. Fig. 4 is an end elevation. Fig. 5 is a cross sectional view. Figs. 6, 7, and 8 are details. Figs. 9, 10 and 11 illustrate respectively the stretched loaf molded into a series of smaller loaves, the stretched loaf and the loaf prior to its being stretched.

Referring to the drawings in detail, 9, 10, 11 and 12 denote a series of supports. The supports 9 and 10 are connected together by a longitudinally extending bar 13 and the supports 11, 12 are connected together by a longitudinally extending bar 14. The supports 9, 10 are formed integral with the bar 13 and the supports 11, 12 are formed integral with the bar 14. The bar 13 is arranged parallel to the bar 14 and interposed between the said bars 13, 14 is a longitudinally extending supporting plate 15, which has a pair of longitudinally extending depending flanges 16, one of which is secured to the bar 13 and the other of which is connected to the bar 14. The hold fast device for securing the flanges 16 in position are indicated at 17. The supporting plate 15 connects the bars 13, 14 together and further maintains the said bars in spaced relation with respect to each other.

Journaled in one end of the bars 13, 14 is a shaft 18 which is provided with a drum or pulley 19. Journaled in the other end of the bars 13, 14 is a shaft 20 provided with a drum or pulley 21 of greater diameter than the drum or pulley 19. The shafts 18, 20 are arranged in parallelism. Traveling over the drums 19, 21 is an endless conveyer 22, formed of suitable fabric and supported by the plate 15. The conveyer 22 constitutes a traveling platform for conveying a loaf of dough while being operated on to form smaller loaves for the purpose of manufacturing rolls, biscuits and buns. By setting up the drums 19, 21 of greater diameter with respect to each other, that part of the conveyer 22 which is active, extends downwardly at an inclination from the drum 20 and toward the drum 19. The shaft 20 projects from the bar 14 and is provided with a sprocket wheel 23 which is adapted to be connected to the prime mover, not shown, for the purpose of driving the shaft 20, for operating the conveyer 22.

Secured to the outer side of each of the bars 13, 14 near that end in which is journaled the shaft 20, is a plate 24, which projects above its respective bar and is provided with a pair of upwardly extending inclined arms 25, 26. The arms 25, 26 incline in opposite directions with respect to each other and project from the upper corners of the plate 24. The arms 25, 26 oppose each other and journaled in the arms 25 is a shaft 27, and journaled in the arms 26 is a shaft 28. The shafts 27, 28 are provided with drums or pulleys 29 and traveling over said pulleys 29, is an endless conveyer 30. The shaft 28 projects from one of the arms 26 and is provided with a sprocket pinion 31. The projecting end of the shaft 20 is provided with a sprocket pinion 32 and engaging with the said members 31, 32 is a transmission belt 33, driven from the pinion 32 upon the shaft 20.

Extending longitudinally with respect to the bars 13, 14 and arranged between the plates 24, is a feed plate 34, having a pair of flanges 35, which are secured to the plates 24 by the hold fast devices 36. The inner end of the feed plate 34 projects inwardly from the inner end of the plates 24 and the outer end of the feed plate 24 projects outwardly from the outer end of the plates 24. The outer end of the feeding plate 34 is upwardly curved as at 37. The conveyer 30 in connection with plate 34 is utilized for feeding a loaf of dough to the conveyer 32.

Secured to that end of the bar 13, 14, in which is journaled the shaft 18 is a downwardly curved discharge plate 38 for the smaller loaves from which the rolls, biscuits and buns are made. Pivotally connected to the outer face of the bar 13 in proximity to that end in which is journaled the shaft 18 is a hinge member 39, provided with barrels 40 through which extends a pintle 41 for pivotally connecting the barrels 42 formed on the longitudinal marginal portion 43 of a combined molding and cutting member 44. The longitudinal marginal portion 43 of the member 44 is provided with barrels 45, which are hinged as at 46, to the upper end of a vertical adjusting screw 47, which extends through and engages with a lateral offset 47' formed on the plate 14. Pivotally connected to the outer side of the bar 13 in proximity to that end in which is journaled the shaft 18 is a sectional clamping member consisting of a lower section 48, having an opening 49, for the purpose of receiving means to pivotally connect said section 48 to the bar 13. The section 48 is angle shape in contour and to the horizontal arm 50 thereof, is hinged as at 51, the vertical arm of the angle shaped upper section 52. The horizontal arm of the upper section 52 opposes the horizontal arm 50 of the lower section 48. Carried by the horizontal arm of the upper section 52 is an adjustable clamping screw 53.

The bar 13 is provided with an offset portion 54 extending upwardly therethrough and engaging therewith is an adjusting screw 55, having hinged to its upper end, as at 56, a clamping member 57 which is adapted to engage the longitudinal marginal portion 58 of the molding and cutting member 44. The longitudinal portions 43 and 58 of the molding and cutting member are flat and of a width to extend over the bars 13, 14 and that portion of the member 44 between the longitudinal marginal portions 43 and 58 is corrugated as at 59. The corrugations are disposed longitudinally and gradually decrease in height and width toward that end of the plate which is pivoted to the hinged member 39. The member 44 is positioned over the active portion of the conveyer 22, extends at an inclination with respect to the bars 13, 14, but at a greater inclination than the inclination of the active portion of the conveyer 22.

The vertical adjustable hinged connection between the bar 14 and the member 44 and the vertical adjustable clamp are utilized for the purposes of adjusting the member 44 to the desired inclination and as the hinged member 39 and section 48 are pivoted, it is obvious that provision is made whereby the said member 44 can be adjusted to the desired position. The member 44 can be swung from over the active portion of the conveyer 22 when occasion so requires and during the operation of the machine the member 44 is clamped in position by the adjustable and sectional clamp, as is obvious. The corrugations of the member 44 in connection with the active portion of the conveyer 22 provides molding cavities 60 and at the points of mergence of the corrugations with each other, cutting edges 61, are provided for severing the loaf into smaller loaves for the purpose of manufacturing the rolls, biscuits and buns.

The loaf of dough in the form, as indicated at 62, is fed to the plate 34, either manually or by machine, and is taken up by the conveyer 30 and caused to travel over the plate 34 and is discharged upon the active portion of the conveyer 22. The conveyer 30, in connection with the plate 34 acts to stretch the loaf. When the loaf is fed upon the active portion of the conveyer 22, it is conveyed in a rolling manner and in a direction toward the plate 38 and through the molding cavities 60.

Owing to the manner in which the member 44 is positioned with respect to the active portion of the conveyer 22 and owing to the manner in which the corrugations 59 are set up, the loaf will be gradually molded into smaller loaves and the cutting or shearing edges 61, will gradually pass through the loaf 62 until the small loaves, which are being molded, are separated and the said smaller loaves, which are indicated by the reference character 63 will, through the medium of the active portion 22, be discharged upon the plate 38. As the loaf 62 is being acted upon the member 44, in connection with the active portion of the conveyer 22, the loaf is gradually revolved which assists in the molding action. As the active portion of the conveyer extends at an inclination toward the plate 38, the transporting of the loaf which is being acted on through the molding cavity or cavities, is facilitated. Although the member 44, as illustrated, is provided with twelve corrugations for forming twelve smaller loaves, yet it is to be understood that the corrugations can be increased or diminished by increasing or decreasing the number of smaller loaves made from the loaf 62 when the latter is fed to be acted upon by the member 44 in connection with the active portion of the conveyer 22.

What I claim is:—

1. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges and an endless conveyer traveling over said platform beneath said corrugated member for carrying a loaf of dough along the platform.

2. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges, said member being arranged at an inclination with respect to said platform and an endless conveyer traveling over said platform beneath said corrugated member for carrying a loaf of dough along the platform.

3. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges, said member being arranged at an inclination with respect to said platform, means for adjusting the inclination of said member and an endless conveyer traveling over said platform beneath said corrugated member for carrying a loaf of dough along the platform.

4. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges, means for feeding a loaf of dough to said platform and means for moving the loaf toward the other end of the platform.

5. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges, said member being arranged at an inclination with respect to said platform, means for feeding a loaf of dough to said platform and means for moving the loaf toward the other end of the platform.

6. A machine for molding dough for manufacturing rolls, comprising a support, a longitudinally extending platform carried by said support, a longitudinally extending corrugated member arranged over said platform, hinged to one side of said support and capable of being detachably connected to the other side of said support whereby said plate is maintained in operative position with respect to said platform, the corrugations of said member in connection with said platform providing molding cavities, said corrugations gradually increasing in height and width from one end toward the other and the points of mergence between said corrugations providing dough cutting edges, said member being arranged at an inclination with respect to said platform, and means for adjusting the inclination of said member, means for feeding a loaf of dough to said platform and means for moving the loaf toward the other end of the platform.

In testimony whereof I affix my signature in the presence of two witnesses.

WILLIAM L. McCANDLESS.

Witnesses:
MAX H. SROLOVITZ,
NICHOLAS L. BOGAN.

Copies of this patent may be obtained for five cents each, by addressing the "Commissioner of Patents, Washington, D. C."